March 25, 1924.        M. C. BLEST        1,488,189
HOOD FOR CAR WHEELS
Filed Oct. 5, 1923
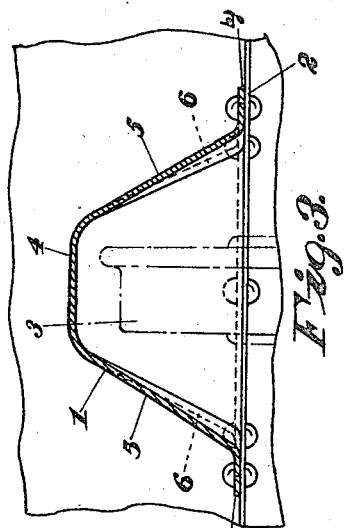
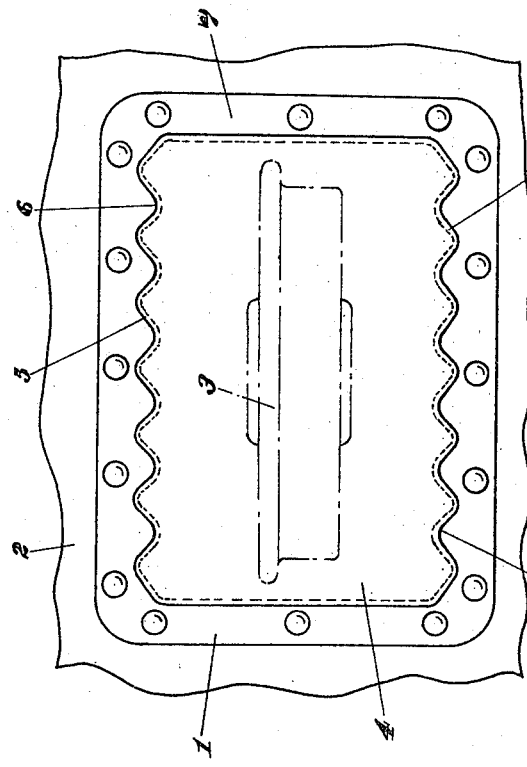
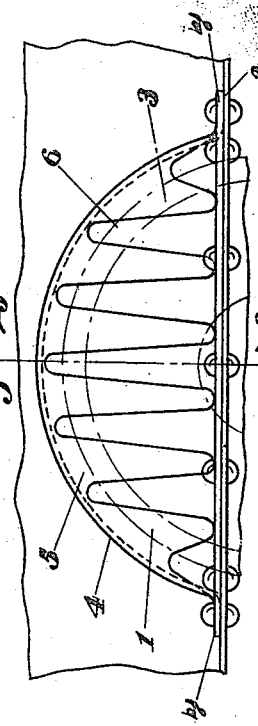

Patented Mar. 25, 1924.

1,488,189

UNITED STATES PATENT OFFICE.

MINOT C. BLEST, OF BELLEVUE, PENNSYLVANIA, ASSIGNOR TO PRESSED STEEL CAR COMPANY, OF PITTSBURGH, PENNSYLVANIA, A CORPORATION OF NEW JERSEY.

HOOD FOR CAR WHEELS.

Application filed October 5, 1923. Serial No. 666,704.

*To all whom it may concern:*

Be it known that I, MINOT C. BLEST, a citizen of the United States, residing in Bellevue, in the county of Allegheny and State of Pennsylvania, have invented certain new and useful Improvements in Hoods for Car Wheels, of which the following is a specification.

An object of the present invention is to provide a car wheel hood which is formed from a single piece of sheet metal and which will be free from slits or openings in which moisture may lodge or through which lading may pass.

Another object of the invention is to provide a car wheel hood having integral strengthening corrugations.

A further object of the invention is to provide a car wheel hood which may be formed from a single piece of sheet metal in such a manner that the metal which has a tendency to buckle during the hood forming operation is taken care of in the proper manner by forming such material into strengthening corrugations, thus eliminating unintentional distortion of the hood.

Referring now to the drawing in which like reference characters refer to like parts, Fig. 1 is a plan view of the wheel hood attached to a portion of a car floor and embodying the invention; Fig. 2 is a side elevational view of the same and Fig. 3 is a sectional view of the same taken on the line 3—3 of Fig. 2.

Referring now in detail to the drawings the reference character 1 indicates a wheel hood which is secured to the floor 2 of a car and covers that portion of the wheel 3 which projects above the floor and prevents lading from passing through the opening in the floor 2 through which a portion of the wheel passes. The wheel hood 1, in side elevation, is in the form of a segment of a circle having a flat outer portion 4 and outwardly sloping side portion 5 which side portions are provided with corrugations 6. This hood is also provided with a horizontally disposed flange 7 which extends entirely around the hood and is secured to the floor 2 of the car and when so secured covers that portion of the wheel which projects above the floor 2.

It will be noted that the hood just described is made from a single piece of sheet metal without slitting the metal from which it is formed, thus eliminating open corners or overlapping of the material to form a joint. In forming a wheel hood embodying the invention the metal in excess of that which would be needed if the corners were slit is taken care of in a proper manner by forming this excess metal into strengthening corrugations.

Having thus described the invention, what I claim as new and desire to secure by Letters Patent is:—

1. A hood for a car wheel, said hood having a top portion which is flat transversely of the hood and curved longitudinally of the hood, and corrugated side portions.

2. A hood for a car wheel, said hood having corrugated side portions, a top portion integral with said sides and a continuous flange integral with said sides and top.

3. A car wheel hood formed from a single piece of sheet metal and having corrugations formed therein adapted to prevent the metal from buckling as the hood is being formed.

4. A car wheel hood formed from a single piece of sheet metal said hood having corrugations which are formed as the hood is being formed to prevent the metal from buckling during the forming operation.

5. A car wheel hood having a top portion which is flat in one direction and curved in another direction, and corrugated side portions.

6. A car wheel hood in the form of a segment of a circle having a horizontally disposed top portion, and outwardly sloping side portions, and corrugations in said side portions.

7. A car wheel hood in the form of a segment of a circle having a horizontally disposed top portion, side portions extending downwardly from said top portion, and corrugations of varying length formed in said sides.

In testimony whereof I affix my signature in the presence of two witnesses.

MINOT C. BLEST.

Witnesses:
KATHLEEN KLEBER,
COLMAN F. ZAITZ.